(12) United States Patent
Abdurrahman et al.

(10) Patent No.: US 9,226,330 B2
(45) Date of Patent: Dec. 29, 2015

(54) WIRELESS MOTION ACTIVATED USER DEVICE WITH BI-MODALITY COMMUNICATION

(71) Applicant: Playtabase, LLC, Minneapolis, MN (US)

(72) Inventors: Muhammad Abdurrahman, Minneapolis, MN (US); Ahmed H. Daoud, Saint Louis Park, MN (US); Christopher Jaszewski, Minneapolis, MN (US); Dingyi Liu, Minneapolis, MN (US); Dhruv Pratap Singh, Minneapolis, MN (US); Alexander Baker, Wilmar, MN (US)

(73) Assignee: Playtabase, LLC, Minneapolis, MN (US)

( * ) Notice: Subject to any disclaimer, the term of this patent is extended or adjusted under 35 U.S.C. 154(b) by 0 days.

(21) Appl. No.: 14/481,147

(22) Filed: Sep. 9, 2014

(65) Prior Publication Data
US 2015/0072619 A1  Mar. 12, 2015

Related U.S. Application Data

(60) Provisional application No. 61/875,973, filed on Sep. 10, 2013.

(51) Int. Cl.
*H04B 7/00* (2006.01)
*H04W 76/02* (2009.01)
(Continued)

(52) U.S. Cl.
CPC ............ *H04W 76/023* (2013.01); *H04W 4/008* (2013.01); *H04W 4/027* (2013.01); *H04W 12/06* (2013.01)

(58) Field of Classification Search
USPC ........... 455/41.2, 41.3, 556.1, 556.2, 557, 91, 455/92, 95, 100, 418, 419, 420; 345/157, 345/158, 168
See application file for complete search history.

(56) References Cited

U.S. PATENT DOCUMENTS 6,141,643 A * 10/2000 Harmon ............... G10L 21/06
                                              235/462.44
6,763,320 B2 * 7/2004 Kimble ............... G06F 3/017
                                              702/182

(Continued)

OTHER PUBLICATIONS

U.S. Appl. No. 13/804,373, Examiner Interview Summary mailed Mar. 26, 2015, 3 pgs.

(Continued)

*Primary Examiner* — Tuan A Tran
(74) *Attorney, Agent, or Firm* — Schwegman Lundberg & Woessner, P.A.

(57) ABSTRACT

A device, system or method may include a body-wearable user device including a user device wireless transceiver configured to communicate directly with a secondary device wireless transceiver associated with a secondary device, a sensor configured to sense a physical motion of at least one of the user device and a body part of a user of the user device and output a signal based on the physical motion, and a processor configured, based on the output from the sensor, to cause the user device wireless transceiver to transmit to the secondary device wireless transceiver a pair signal according to a first wireless modality based, at least in part, on the signal and complete a wireless pairing between the user device wireless transceiver and the secondary device wireless transceiver according to a second wireless modality different than the first wireless modality.

19 Claims, 13 Drawing Sheets

(51) Int. Cl.
  *H04W 4/00*    (2009.01)
  *H04W 4/02*    (2009.01)
  *H04W 12/06*   (2009.01)

(56) References Cited

U.S. PATENT DOCUMENTS

| | | | |
|---|---|---|---|
| 7,831,932 | B2 | 11/2010 | Josephsoon et al. |
| 7,907,901 | B1 * | 3/2011 | Kahn .................. H04M 1/7253 455/41.1 |
| 8,170,656 | B2 * | 5/2012 | Tan .......................... G06F 1/163 345/157 |
| 8,787,006 | B2 | 7/2014 | Golko et al. |
| 8,838,185 | B2 * | 9/2014 | Blanda, Jr. ............. H04W 24/02 455/404.2 |
| 8,897,704 | B1 * | 11/2014 | Kahn .................. H04M 1/7253 455/41.1 |
| 8,994,498 | B2 * | 3/2015 | Agrafioti ................. G06F 21/40 340/5.52 |
| 8,994,827 | B2 * | 3/2015 | Mistry .................. H04N 5/2252 348/158 |
| 9,060,385 | B1 * | 6/2015 | Manning ............... H04W 84/18 |
| 2005/0212759 | A1 | 9/2005 | Marvit et al. |
| 2006/0093998 | A1 | 5/2006 | Vertegaal |
| 2006/0158515 | A1 | 7/2006 | Sorensen |
| 2007/0139370 | A1 | 6/2007 | Lu et al. |
| 2008/0110115 | A1 | 5/2008 | French |
| 2009/0153477 | A1 * | 6/2009 | Saenz ...................... G06F 3/014 345/158 |
| 2009/0212979 | A1 * | 8/2009 | Catchings ............... G06F 3/014 341/20 |
| 2010/0219989 | A1 * | 9/2010 | Asami ..................... G06F 3/014 341/20 |
| 2010/0234182 | A1 * | 9/2010 | Hoffman .............. A61B 5/1125 482/8 |
| 2012/0169860 | A1 * | 7/2012 | Lian ........................ G06F 3/017 348/77 |
| 2014/0049417 | A1 | 2/2014 | Abdurrahman et al. |
| 2014/0132410 | A1 * | 5/2014 | Chang .................... G06F 3/014 340/539.11 |
| 2015/0130698 | A1 * | 5/2015 | Burgess ................. G06F 1/163 345/156 |
| 2015/0140934 | A1 | 5/2015 | Abdurrahman et al. |

OTHER PUBLICATIONS

U.S. Appl. No. 13/804,373, Final Office Action mailed Jul. 10, 2015, 19 pgs.
U.S. Appl. No. 13/804,373, Non Final Office Action mailed Jan. 2, 2015, 12 pgs.
U.S. Appl. No. 13/804,373, Response filed Apr. 2, 2015 to Non Final Office Action mailed Jan. 2, 2015, 10 pgs.

* cited by examiner

WIRELESS MOTION ACTIVATED USER DEVICE WITH BI-MODALITY COMMUNICATION

PRIORITY

This application claims the benefit of priority to U.S. Provisional Application No. 61/875,973, filed Sep. 10, 2013, which is incorporated by reference herein in its entirety.

TECHNICAL FIELD

The disclosure herein relates generally to a wireless motion-activated command transfer device, system, and method.

BACKGROUND

Consumer electronic devices, such as smartphones, gaming consoles, and the like, have incorporated sensors that are sensitive to the motion of the consumer electronic device. A smartphone may include, for instance, an accelerometer to detect relative motion and orientation of the smartphone in comparison to a reference, such as a gravitational field. A gaming console may include visual recognition of movement of a controller relative to the console or a user of the console. The operation of the smartphone and the gaming console may be impacted, at least in part, based on the output from such sensors.

BRIEF DESCRIPTION OF THE DRAWINGS

FIGS. 2A-2C are front, side and perspective images of a user device that is body-wearable.

DESCRIPTION OF THE EMBODIMENTS

Figure 1:
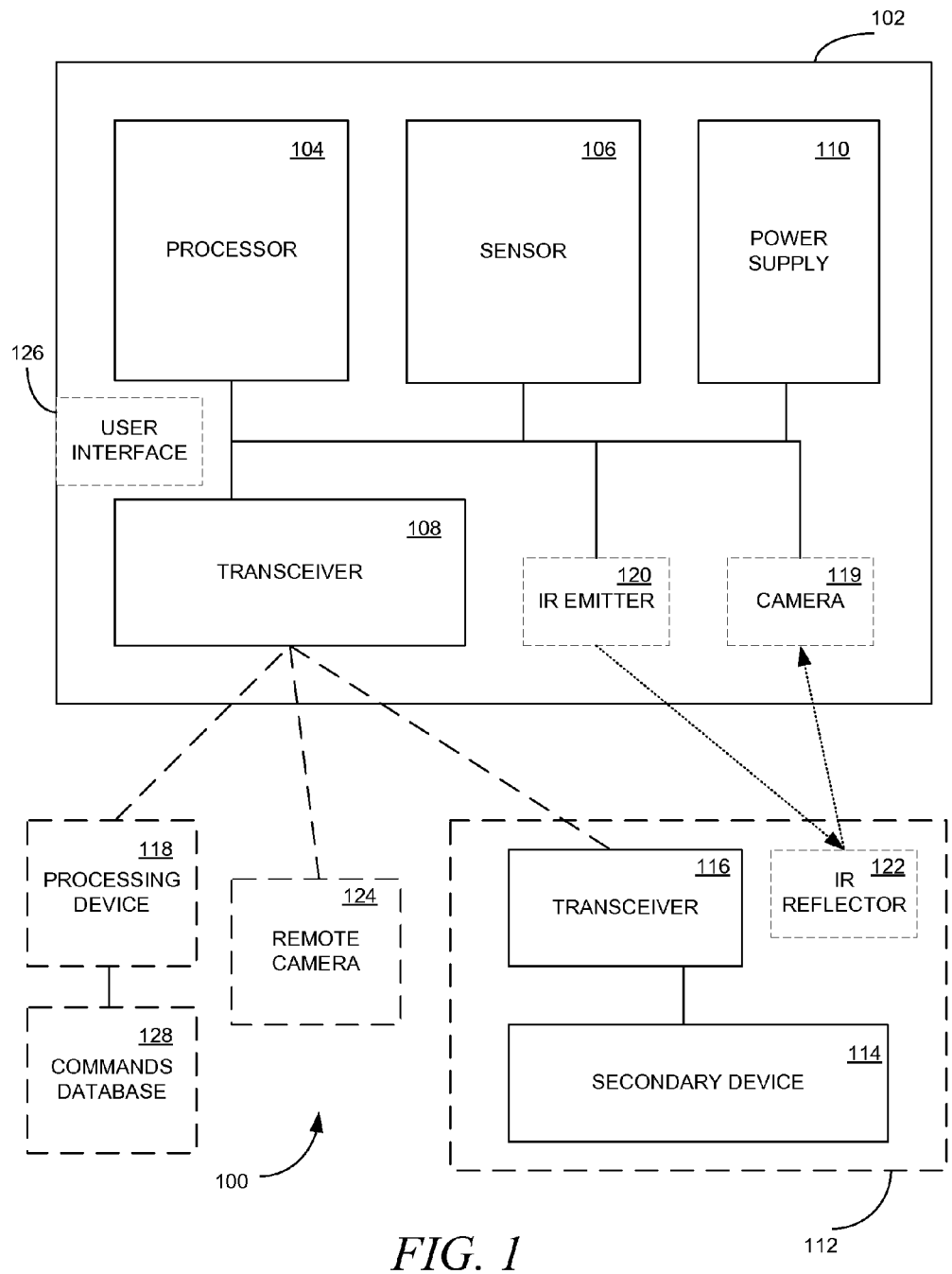
FIG. 1 is a block diagram of an exemplary system that includes a body-wearable user device.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Such consumer electronic devices as the smartphone and gaming console, as described above, are conventionally self-contained, either on the device level, such as the smartphone, or on a system level, as with the gaming console. In other words, while an accelerometer of a smartphone may control the operation of the smartphone, the accelerometer of the smartphone may not necessarily be useful in controlling the operation of a secondary device. Similarly, while the motion control functionality of a gaming console may allow a user to interact with a game provided by the gaming console, a user may be unable to control a secondary device based on the motion control of the gaming console.

To the extent that a motion of such a consumer electronic device may result in an effect on a secondary device, such as from one smartphone to another smartphone, such may, for instance, merely open a communication link, such as via a direct link or via a network, such as the Internet. In an example, two smartphones may open a communication link through manual menu selection followed by "tapping" the two smartphones together, upon which data files may be manually selected for transfer between the smartphones. In an alternative example, an application may allow two smartphones to be tapped together upon which information from one smartphone may be transferred to the other smartphone via an indirect connection, such as the Internet. Additionally, such interactions may be relatively limited in the devices between which such interactions may occur, such as by being limited to smartphone-to-smartphone interaction.

Furthermore, such consumer electronic devices may operate through otherwise conventional user interfaces, such as through hand manipulation of a smartphone or holding a controller on a gaming console. As a result, spontaneous, natural physical motions, such as hand gestures and the like, may be impractical or impossible if doing so would require taking ahold of a smartphone by hand prior to engaging in such physical motions. Further, even if a smartphone were held in the hand and were sensitive to physical motions, such as gestures, the smartphone may not be sensitive to subtle gestures, such as finger motions.

A body-wearable user device, system, and method has been developed that includes a sensor for detecting physical motion by a user of the user device and a communication module for establishing a direct or local communication link with a secondary device. The user device is wearable on the user, such as, but not limited to, on a wrist or arm. The user device may be sensitive to physical motions by the user and, on the basis of the physical motion, transmit instructions to the secondary device. The instructions may result in an automatic data transfer, such as of predetermined data, from the user device to the secondary device. The instructions may control, at least in part, the performance of the secondary device. The nature of the physical motion of the user may determine what instructions are transmitted from the user device to the secondary device. The physical motion may be less subtle than the movement of the body part on which the user device is located, e.g., the user device located on an arm may be sensitive to the movement of the user's fingers.

FIG. 1 is a block diagram of an exemplary system 100 that includes a body-wearable user device 102. As will be disclosed in detail, the user device 102 may be wearable on a wrist, arm, or other suitable location on a user. The wearable user device 102 may be a single device or may incorporate components within multiple wearable individual components, such as a first component that is wearable on a wrist and a second component that is wearable on a finger. Such components may be in communicative contact with one another, whether wired or wireless, according to the communication modalities disclosed herein.

The user device 102 includes a processor 104, a sensor 106, a transceiver 108, and a power supply 110, such as a battery. The processor 104 may be a conventional, commercially available processor or controller, or may be proprietary hardware. The sensor 106 may include one or more gyroscopes (e.g., a three-axis gyroscope), accelerometers (e.g., a three-axis accelerometer), magnetometers (e.g., a three-axis magnetometer), proximity sensors, electromyography (EMG) sensors, and global positioning system (GPS) sensor, among other potential motion detecting sensors. The sensor may further include visual emitters and sensors, such as may detect light in the visual or infrared bands, among other light bands. The sensors 106 may be commercially available, off-the-shelf components with hardware and firmware that may be integrated with respect to the rest of the user device 102.

The device 102 may include an active state, in which the functions of the device 102 are entirely or substantially engaged and available for use, and one or more deactivated states, such as a sleep mode and/or a powered off mode. In an example, the device 102 may be placed in the active state from a deactivated state by placing the device 102 on the user, as illustrated herein. In an example, the sensor 106 includes a sensor that may detect proximity of user skin, such as a temperature sensor, an ohmmeter, and other sensors. In an example, the device 102 includes an isolated low power switching circuit configured to sample the sensor 106, e.g., a temperature sensor, at a predetermined rate, such as two (2) Hertz. Once the sensor 106 detects a temperature, e.g., above approximately thirty-five (35) degrees Celsius, the device may be placed in the active state. In such an example, the sampling rate of the sensor 106 may be reduced, e.g., to approximately one (1) Hertz. In various examples, subsequent temperature readings at or above a threshold, such as thirty-three (33) degrees Celsius, may maintain the device 102 in active mode. A predetermined number of readings below the threshold, such as thirty (30) seconds of such readings below the threshold, may set the device 102 in a deactivated state. It is to be understood that the same criteria may be applied to switching from a deactivated state to the activated state, that various thresholds may be utilized, and that thresholds suitable to various types of sensors 106 may be utilized.

The power supply 110 may be a rechargeable battery (e.g., a lithium ion battery or other rechargeable battery known in the art), a replaceable battery, or other form of energy storage device. In various examples, the processor 104 may cause the user device 102 to go into a hibernation or sleep mode based, for instance, on extended inactivity. Consumption of energy from the power supply 110 may be reduced from normal operational levels in hibernation mode.

The transceiver 108 may include an antenna and may transmit and receive wireless signals according to one or more of a variety of modalities, including Bluetooth (e.g., according to the Bluetooth 4.0 standard), infrared laser, cellular, 802.11 WiFi, induction wireless, ultra-wide band wireless, Zigbee, and other short and long range wireless communication modalities known or yet to be developed. The user device 102 may optionally further include wired communication modalities, such as universal serial bus (USB) or any of a variety of wired communication modalities known in the art. The user device 102 may utilize wired communication modalities for device 102 updates and the like.

The transceiver 108 may include commercial off-the-shelf components with hardware and firmware that may be integrated into the user device 102. In various examples, the transceiver 108 includes only a transmitter without a receiver or operates only in a transmit mode. In such examples, the user device 102 may transmit commands as disclosed herein without receiving communication back from other transmitters. In various examples, multiple wireless modalities may be utilized for different purposes or within a single communication session. For instance, an infrared signal, as disclosed herein, may be utilized to select a secondary device system 112 in the first instance, followed by switching to a second wireless modality, such as Bluetooth, for the transmitting of following information and/or commands, as disclosed herein.

As noted, the transceiver/receiver 108, and other transceivers/receivers disclosed herein, may use infrared wireless communication modalities. In an example, such infrared wireless communication modalities may have a range of approximately fifty (50) feet, though greater or lesser range is contemplated. The transceiver 108 may incorporate a lens, such as may provide or focus a canonical field of vision. The canonical field of vision may be increased or decreased based on the particular lens selected. In an example, an infrared receiver is recessed within a housing to reduce the receiver's field of vision, facilitating particular selection between multiple adjacent receivers.

The user device 102 may include a data logging device, such as electronic data storage and/or electronic memory, in or with respect to the processor 104. The user device 102 may be implemented as custom-designed and built dedicated hardware or as an adapted commercial product, such as a smartphone, personal digital assistant, and the like. The user device 102 may employ additional software, sensor and processing power from such devices as well. A system incorporating paired user devices 102, as discussed below, can include user devices 102 that are both custom-designed, both adapted commercial products, or a mix between custom-designed and adapted commercial products.

As illustrated, the system 100 includes a secondary device system 112. The secondary device system 112 may optionally not be part of the system 100 itself but rather may be interacted with by the system 100, in general, and the user device 102 specifically. As illustrated, the secondary device system 112 includes a secondary device 114 and a transceiver 116. In various examples, the transceiver 116 is operatively attached to or built into the secondary device 114 and is configured to communicate with the transceiver 108 of the user device 102. As such, the transceiver 116 may be a native component of the secondary device 114 or, as illustrated, a separate component that is communicatively coupled to the secondary device 114. As illustrated, the transceiver 116 includes both a transmit and receive mode. In an alternative example, the transceiver 116 is a receiver and is not configured to transmit. The transceiver 116 may communicate with the transceiver 108 as well as other transceivers 116 in systems 100 with multiple secondary device systems 112.

In various examples, the secondary device 114 may be an appliance, a machine, a vehicle, and other commercial devices. In various examples, the secondary device 114 is a home appliance, such as a lamp, or a consumer electronic device, such as a music player, computer, remote control vehicle, smart board, television, and so forth. In an example, the secondary device 114 may be associated with an object such as a door; in such examples, the object may be supplemented with mechanical or electronic controls, e.g., a controllable motor that may open and/or close or lock and/or unlock the door. In an example, the secondary device 114 is a second user device 102 such as may be possessed and used by the same user of the user device 102 or by a different user.

In various examples, the secondary device 114 may include a native processor or other controller that may be subject to commands from the user device 102. For instance, where the secondary device is a music player, a processor may be present that may receive commands from the user device 102 and act on those commands as disclosed herein. Alternatively or additionally, the secondary device 114 may be modified with a controller. For instance, a lamp may be modified with an electronic variable intensity control and a controller that may adjust the intensity control based on commands received from the user device 102. Alternatively or in addition, the secondary device 114 may be controlled by interrupting power to the secondary device 114, such as by placing a controllable switch between a wall outlet and a power cord of such a secondary device 114. Thus, for instance, a lamp may be controlled by remotely toggling the switch and/or variably adjusting a light intensity of the lamp based on commands from the user device 102 using various ones of the methodologies disclosed herein.

Figure 7A:
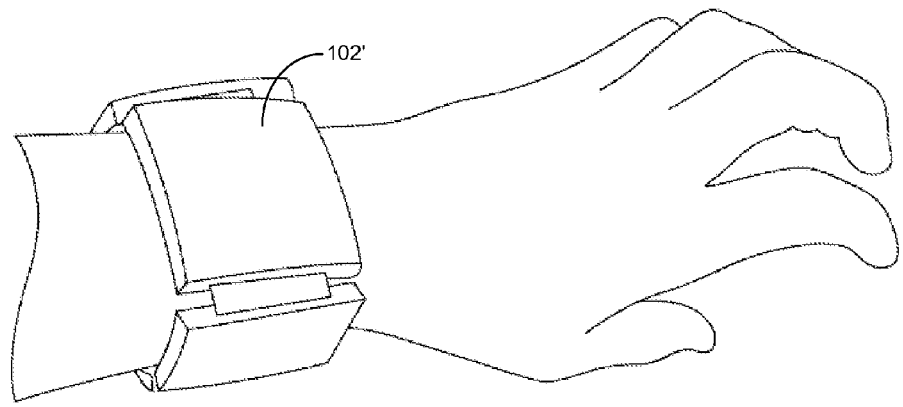
FIGS. 7A and 7B are images of a doorknob-gripping gesture, in an example embodiment.
Figure 7B:
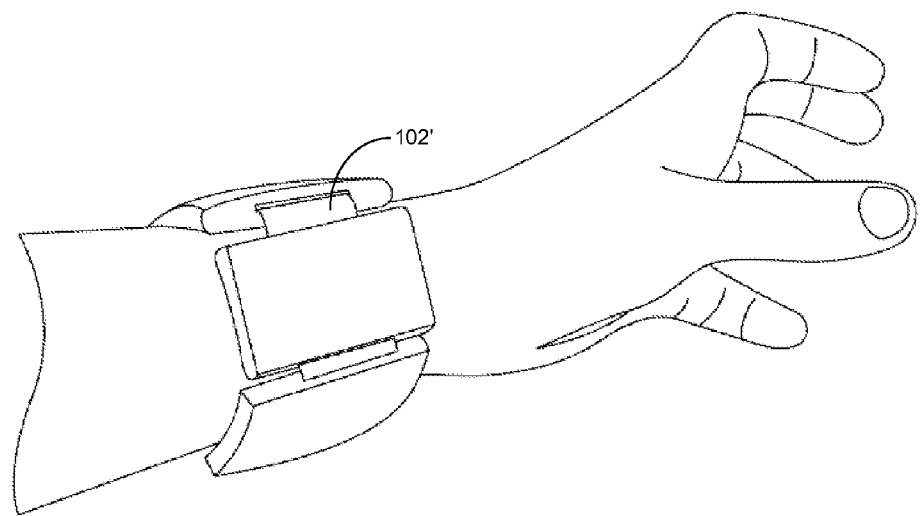

The transceivers 108, 116, and other transceivers disclosed herein, may communicate utilizing encrypted signals or other security and secure access measures to control, at least in part, the access to interface with the devices 102 and the system 100 generally. In an example, a user wearing and using a device 102 may perform a door knob gripping and turning gesture (see FIGS. 7A and 7B). The device 102 may recognize the gesture but the transceiver 116 may not recognize a user identification code in a command stream transmitted from the receiver 108. In such an example, a function of the associated secondary device 115 may not be performed (e.g., a door may not open/close or lock/unlock).

As illustrated, the system 100 optionally includes a processing device 118, such as a smartphone or other device that includes processing capability. The user device 102 may communicate with the processing device 118, such as via the transceiver 108 according to communication modalities available to the processing device 118. In various examples, the processing device 118 may be or function as a hub, a server or the like and may hold information, such as matching identification information, for the secondary devices 114 to be controlled. Such matching identification information may include an identifier, such as a unique identifier, that may be associated with the secondary device system 112, the secondary device system's 112 identifying infrared reflectors (as discussed in detail below), and/or other identifying elements on, near, or attached to the secondary device 114. Optionally, the processing device 118 may serve as an image processor or processor of other data transmitted from the user device 102 that may place undesirable demand on the capacity of the processor 104 of the user device 102. Further, optionally, the processing device 118 may communicate with the secondary device system 112, such as wirelessly via the transceiver 116.

In various examples, the user device 102 may recognize physical motion detected by the sensor 106 and send functional commands to the secondary device system 112 by way of the transceivers 108, 116, based on physical motion of the user device 102 and, by extension, the person, body part, or implement to which the user device 102 is attached or otherwise included. The user device 102 may transmit commands to secondary device systems 112, such as to change an intensity level for a lamps and a music player or make directional movement instructions for machines/vehicles. In various examples, the device may select between or among multiple secondary devices 114 to issue commands including but not limited to Internet related functionalities used in and/or in concert with those machines, etc.

Secondary Device Selection

In various examples, a wearable user device 102 sends commands or activates functions of the secondary device 114, specifically, and the secondary device system 112, generally, based on physical motion. In an example, the selection of a specific secondary device 114 is controlled via one or more of a variety of physical motions that are detectable by the sensor 106. Such physical motions may include, but are not limited to, gestures such as wrist-flicking, finger-pointing, grabbing motions, arm swinging, assuming poses, and other motions, positions, or gestures as may be detected by the sensor 106 and, in various examples, conceived of by a user of the user device 102. While various physical motions are described herein with particularity, it is to be understood that various physical motions are interchangeable as desired, and that the description of one physical motion does not preclude other possible physical motions being used instead of or in addition to the described physical motion. Moreover, various terms for physical motions, such as gestures, may be utilized interchangeably herein, both with respect to the term "physical motion" and with respect to one another.

Figure 8A:
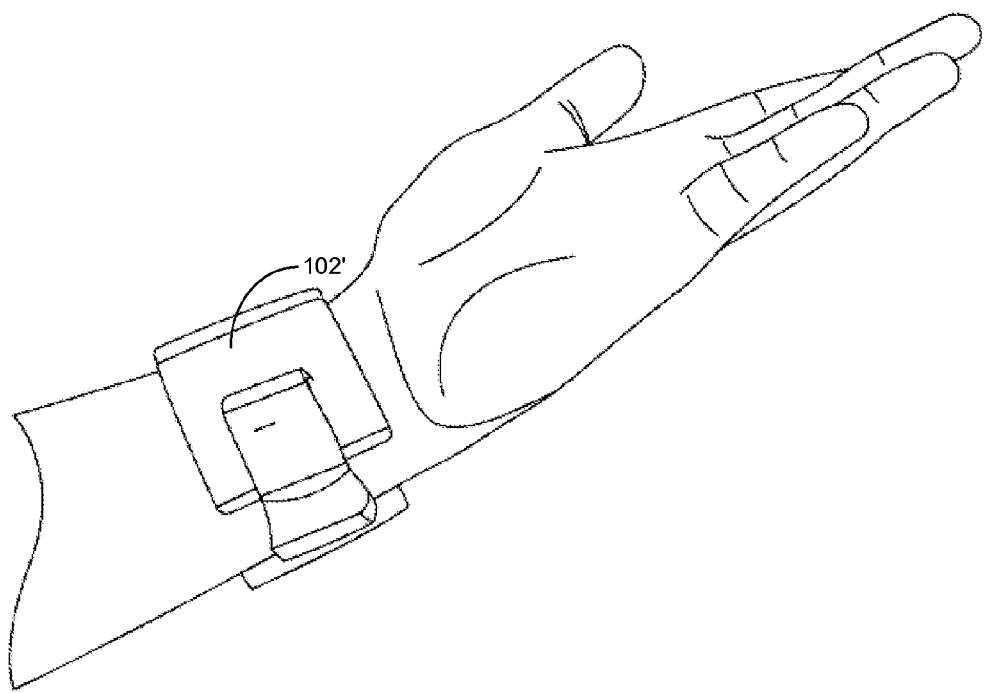
FIGS. 8A-8C are images of secondary device control gestures, in example embodiments.
Figure 8B:
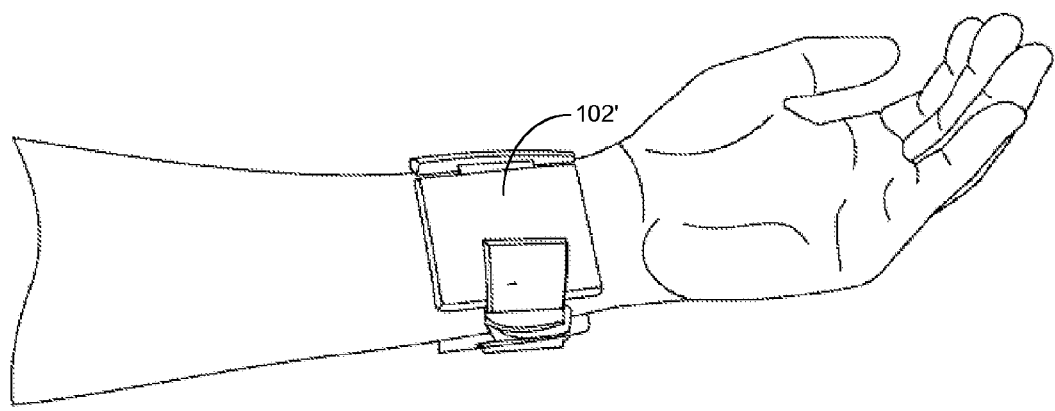

In an example, selection of a secondary device 114 of a set of secondary devices 114 capable of being controlled is based on specified or predetermined physical motions, such as hand gestures and poses. In various examples, such gestures may allow for the selection of a particular secondary device without the user having line-of-sight communication with the machine. In an example, commands, such as increasing the intensity of a lamp or the volume of a television or radio, can be issued with the natural physical motion of a holding the palm-up and lifting the fingers up repeatedly (see FIGS. 8A and 8B). The gesture may optionally further include lifting or lowering the arm at the elbow, such as with the palm up or down. In an example, a diagonal sweep of the arm, such as an approximately forty-five (45) degree sweep from the elbow or shoulder, may be interpreted, in an example with a lamp with a dimming function, as turning the lamp off without intervening dimming of the lamp.

Figure 8C:
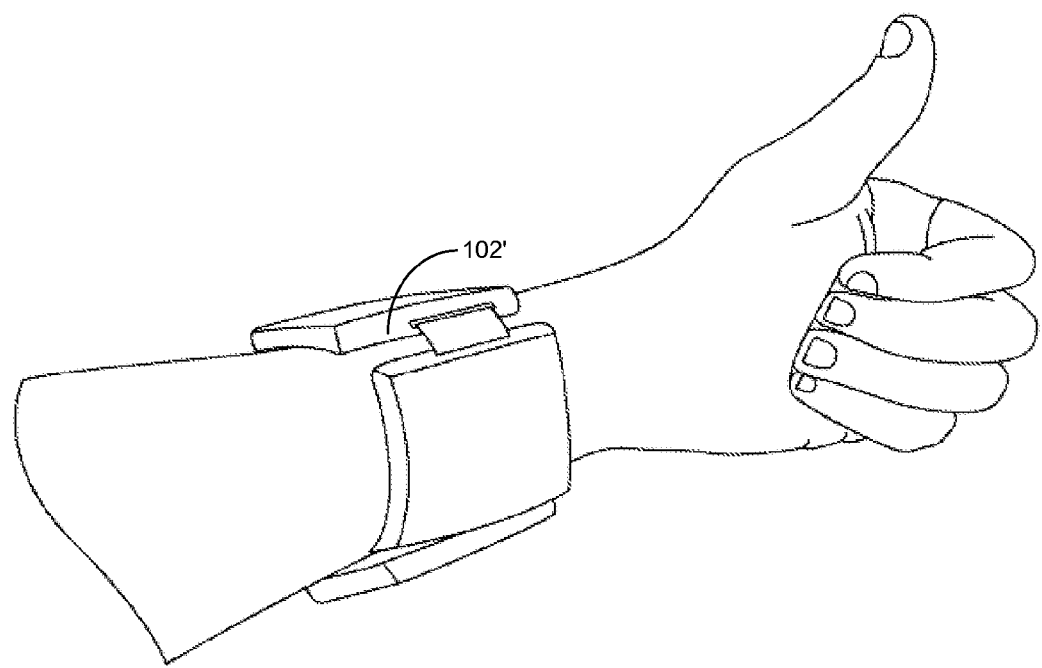

In an example, a user who is wearing a user device 102 and who does not necessarily have line-of-sight to a secondary device 114 makes a "thumbs-up" gesture (see FIG. 8C). The sensor 106 may detect the orientation of the hand and thumb according to methodologies disclosed herein. The processor 104 may recognize the "thumbs-up" gesture as a command to interact with the secondary device 114, e.g., a television set, and directs the transceiver 108 to transmit a selection signal to the transceiver 116 of the secondary device 114. Signals may optionally be transmitted bi-directionally, e.g., between the user device 102 or the processing device 118 and the secondary device 114 to communicate information about the secondary device 114 receiving the command, e.g., in the television example, that a television show is being recorded for later viewing.

In an example, a user who is wearing a user device 102 makes a "grabbing/clutching" gesture, such as may mimic the grabbing/clutching of a doorknob. The sensor 106 may detect the orientation of the hand according to methodologies disclosed herein. The processor 104 may recognize the "grabbing/clutching" gesture as a command to interaction with a secondary device 114, e.g., a television set, and direct the transceiver 108 to transmit a selection signal to the transceiver 116 of the secondary device 114. Signal may optionally be transmitted bi-directionally, e.g., between the user device 102 or the processing device 118 and the door and door lock to communicate information about the door and door lock receiving the command, such as a condition of the door lock, e.g., that the door is locked or unlocked or open or closed. Such a gesture may optionally be used to open and or unlock a door as well as close and lock the door.

In an example, the sensor 106 is or includes an accelerometer. In such an example, a physical motion such as sweeping the user device 102 from left to right, such as when the user device 102 is positioned on an arm or wrist, may be correlated to the selection of a secondary device system 112 such as an audio system. Upon the accelerometer of the sensor 106 generating an output that indicates a sweeping motion from left to right, the processor 104 may direct the transceiver 108 to transmit a wireless command to the transceiver 116 of the secondary device system 112 to open a communication channel. Upon the opening of the communication channel, the user may make a second physical motion, such as holding the palm-up and lifting the fingers up repeatedly, that may be detected by the sensor 106, such as by a proximity sensor, such as may be located in the user device 102 or placed on the body of the user generally, such as on the finger of the user, by an electromyography sensor sensitive to the reaction of muscles and tissue of the user, a camera of the sensor 106 or a remote camera that may be communicatively coupled to the user device 102 (see below). Based on the lifting of the fingers, the volume of the audio device may be increased. Conversely, the accelerometer of the sensor 106 may determine that the palm is down, whereupon manipulation of the fingers may result in a command being issued to lower the volume.

In contrast with commands that adjust the functionality of secondary devices 114, physical motions may be utilized to command the opening of a direct communication link 108, 116 and then transfer information. In an example, two individuals may each be wearing a user device 102 on their respective right arms. In such an example, the two individuals may conventionally shake hands with their right hands. Upon the sensors 106 detecting the up-and-down motion of the handshake, the transceivers 108 of each of the user devices 102 may open a communication channel between the devices. In various examples, each of the user devices 102, upon detecting the handshake motion, may seek to open a communication channel with the closest user device 102 that is also seeking to open a communication channel. The above example is not limited merely to handshaking, and may extend to any of a variety of physical motions that are performed by concurrently or substantially concurrently by user devices 102 in proximity of one another.

Once a communication channel, such as a unidirectional or a bidirectional communication channel according to one or more of the various direct and/or local communication modalities disclosed herein has been opened, one or more of the processors 104 may direct that information that is stored in the memory of the respective user device 102 be transferred to the other user device 102. For instance, the information may include information about an entity, such as a person, a business, an organization, and so forth. Such information may include a personal name, business name, business and/or residential address, phone number, website address, and the like. The information may be structured like or obtained from a business card. Additionally or alternatively, the information transfer can include a command to perform social networking interaction between accounts linked to the two user devices 102. In an example, upon shaking hands, the two users may be "connected" or may be "friends" according to various social network protocols to which each of the accounts belong.

In various examples, the user device 102 may be paired, such as on an ad hoc basis, with the secondary device system 112. In various examples, multiple devices 102, 112 can be paired with respect to one another, including multiple user devices 102 and multiple secondary device systems 112. Optionally, multiple secondary devices 114 may be selected and operated simultaneously. Secondary devices 114 may be selected as a group via gesture and motion. In an example, a group of lights, such as floor and/or ceiling lights, may be selected and controlled via selecting each in a series with only a selection gesture, pantomiming drawing a box around or otherwise encircling the group of lights. Different types of secondary devices 114 may be grouped in a single group. In an example, lights, a radio, and a fireplace may be selected individually or as a group and adjusted to preset settings based on a single command, such as is described above.

In various examples, the pairing can be ad hoc based on proximity and/or physical motions by the user of the user device 102. In an example, upon the user making a particular physical motion, the user device 102 may open a communication link between the transceivers 108, 116 with a secondary device system 112 in closest proximity of the user device 102, such as based on either the secondary device 114 itself or the transceiver 116. In an example, as will be detailed herein, a particular physical motion may correspond to particular types of secondary device systems 112; for instance, a first physical motion may correspond to secondary devices 114 which are lamps, a second, different physical motion may correspond to secondary devices 114 which are audio equipment, and so forth. Upon making the first physical motion, for instance, the user device 102 may open a communication channel with the secondary device system 112 that corresponds to the lamp in closest proximity of the user device 102.

As noted above, physical motions may be related to particular secondary device systems 112. In various examples, each secondary device system 112 may correspond to a unique physical motion. In such an example, upon the user making the physical motion, the user device 102 may open a communication channel between the transceivers 108, 116 upon detecting the physical motion that corresponds to the particular secondary device system 112 provided the transceivers 108, 116 are within communication range of one another. In an example, a user device 102 that includes a wrist-worn device and a finger-worn device can share motion recognition data acquired from sensors 106 in each device of the user device 102 for the user to utilize a single hand with a wrist flicking pointing gesture in the direction of a the secondary device system 112, such as the transceiver 116, to control, at least in part, the functions of the secondary device 114.

In an example, the processor 104 and/or the processing device 118 may include image recognition or computer vision software that may, in conjunction with visual sensors of the sensor 106, such as a camera, visual spectrum filters, infrared filters, and infrared reflectors, form an image recognition system. In an example, the image recognition system may detect, for instance, the secondary device 114 (or an image or object representative or indicative of the secondary device 114, such as is disclosed herein). In an example, the sensor 106 may include a camera 119 (rendered separate from the sensor 106 for example purposes only) and may use infrared mechanical filters, such as a lens filter that may be purchased off-the-shelf or constructed and placed over the lens of the camera 119, or electronic filters, such as may be implemented by the processor 104, to cancel out visual noise received by the camera 119.

In an example, the sensor 106, or the user device 102 generally, optionally includes an infrared light emitter 120, such as an infrared lamp. In such an example, the secondary device system 112 optionally includes an infrared reflector 122. In various examples, the infrared reflector 122 is positioned on or near the secondary device 114. In various examples, the infrared reflector 122 is an infrared marker known in the art, such as an infrared sticker that may be adhered to or in proximity of the secondary device 114. Such an infrared marker may conventionally reflect a pattern or design at infrared wavelengths when impacted by incident infrared light. In such examples, the camera 119 may detect the reflected infrared light from the infrared marker and conventional pattern or image recognition software implemented by the processor 104 may recognize the image reflected by the infrared marker. The user device 102 may store associations between infrared marker patterns and particular secondary devices 114 and, on the basis of the camera 119 receiving the reflected pattern and the processor 104 identifying the pattern, identify the associated secondary device 114 and open a wireless communication channel between the transceivers 108, 116, responsive to gesture-based commands, such as by communication methods disclosed herein. Identification of the secondary device 114 for selection may utilize computer vision systems or software that may be obtained off-the-shelf or custom designed. In such examples, and in contrast to certain wireless communication schemes described herein, the camera-based connection modes may require line-of-sight with the object to be controlled by the user device 102.

In contrast to the above examples, which utilized a marker that may be identified with conventional image recognition software, in various examples the processor 104 may utilize image recognition software that may recognize the secondary device 114 itself. In such an example, the image recognition system may identify the secondary device 114 from multiple potential aspects of the secondary device 114. Alternatively or in addition, the image recognition system may include custom-designed hardware and systems and/or adapted commercial products. Such products, such as a smartphone, may include wearable devices with cameras, an audio user interface, such as a microphone and/or speaker, and a visual display user interface. In an example, the outline of or an image of the secondary device 114 may be displayed to a user of the user device 102 and may be highlighted by the computer vision software on the visual display to help the user identify which secondary device 114 has been selected.

The user device 102 may optionally include a user interface, such as may include an audio user interface and a visual display user interface. Such a user interface may be utilized according to the disclosure herein, such as to give audio and/or visual prompts for the operation of the user device 102, to display information in the user device 102 or obtained from another user device 102 or secondary device system 112, and so forth.

Other examples of ad hoc pairings with secondary device systems 112 with cameras may include the use of cameras 124 remote to the user device 102. For instance, such remote cameras 124 may be in proximity of the user of the user device 102, such as in the same room or general area of the user, may be in the room or area of the secondary devices 114 to be controlled, or on the secondary devices 114 themselves. In such an example, the remote camera 124 may be part of the sensor 106 or may work in tandem with the sensor 106, such as by communicating with the user device 102 via the transceiver 108. In such examples, a user may make a physical motion that is detected by at least one of a sensor on the user device 102 and a remote camera 124. In various examples, both the sensor on the user device 102 and the remote camera 124 may detect the physical motion. Based on input received from one or both of the on-device 102 sensor and the remote camera 124, the processor 104 may identify the physical motion and correlate the physical motion to a particular secondary device system 112 and open a communication channel between the transceivers 108, 116 if the transceivers are within communication range of one another.

The above image recognition-based mechanisms may store information related to a position of various objects, including the user device 102 and the secondary device system 112. The stored location information may be utilized, for instance, to aid in or otherwise accelerate the image recognition process. For instance, the user device 102 or the processing device 118 may have stored information that a particular lamp was previously located at a particular location in a room, such as on a table. When, for instance, during operation of the user device 102 the camera 119 produces an output that suggests that the portion of the room that was previously known to have the lamp is being focused on, the image recognition system may merely verify the continued presence of the lamp rather than have to identify the lamp in the first instance.

Additionally or alternatively, other sensors 106 may utilize previously stored location information of a secondary device system 112, and the location information may operate without respect to the image recognition system. For instance, if the output of an accelerometer and gyroscope indicates that the user is pointing toward a previously known location of a particular secondary device system 112, such as the lamp in the above example, the processor 104 and/or the processing device 118 may assume that the lamp is to be selected and merely verify the continued presence of the lamp.

The user device 102 and/or the system 100 in general may incorporate a user interface 126 for presenting visual, audio, haptic or other sensory information to a user of the device 102 or to an individual positioned in proximity of the user device 102. For instance, a light may flash, a tone may sound, or a vibration or "rumble" may be triggered to indicate a selection of a secondary device 114 or a failure to select the secondary device 114. In an example, a single flash, tone, or vibration may indicate a successful selection of a secondary device 114 while multiple flashes, tones, or vibrations may indicate an unsuccessful selection of a secondary device. Such visual, audio, or haptic signals may be utilized to convey any of a variety of additional information that may be useful to a user, including indicating a low battery charge, a full battery charge, software upgrades, and so forth.

The system 100 may further include a commands database 128 including database entries and/or a lookup table. The commands database 128 may be a part of an electronic data storage device, such as a non-volatile storage device known in the art. The commands database 128 may all for gestures to be cross-referenced with commands that correspond to a particular secondary device 114 or secondary device 114 type. Thus, for instance, a given gesture (e.g., point and flick) may correspond to a command to turn on a lamp or change a song on a media player, depending on which secondary device 114 has been selected. The commands database 128 may have entries that correspond to how gestures map to commands for a lamp and how gestures map to commands for a media player. Thus, when the processing device 118 receives an indication of a gesture from the user device 102, the processing device 118 may cross-reference the gesture and the type of secondary device 114 to determine the command to be sent to control the operation of the secondary device 114.

Selection and Control Subroutines

The above processes relate to the selection and control of a particular secondary device 114 may be performed on the basis of certain subroutines as implemented by the processor 104. Such subroutines are presented by way of example and may be optionally implemented. Selection and functional control of particular secondary devices 114 may proceed using all, some, or none of the following subroutines, as well as subroutines that may not necessarily be described herein.

A "calibration" subroutine may orient a magnetometer, accelerometer, and/or gyroscope among other potential sensors 106. In such a calibration subroutine, the magnetometer may find or attempt to find magnetic north and send calibrated and/or confirmation data to the processor 104. The processor 104 may calculate an angle between the orientation of the user device 102 and magnetic north. The angle may be used as a reference angle in the horizontal plane. The reference angle may be utilized to calibrate data obtained from a gyroscope. The accelerometer may find the direction of gravity, which may be sent to the processor 104. The processor may calculate an angle between the orientation of the user device 102 and the direction of gravity. This angle may be used as a reference angle in the vertical plane, which may be used to calibrate the data obtained from the gyroscope.

An "orientation" subroutine may utilize the processor 104 to calculate the orientation of the user device 102, such as with the gyroscope. The orientation may be obtained by orientation taking the integral of the data of angular speed from the gyroscope with respect to time in order to calculate the relative orientation of the user device 102. The absolute orientation may be calculated by adding the reference angles as obtained by the calibration subroutine to the relative orientation.

An "orientation to pointing direction" subroutine may compute a pointing direction vector of the user device 102 using the orientation information of the device obtained from the calibration and orientation subroutines. In an indoor environment, it may be assumed that the wearable device stays comparatively close to a fixed reference point, such as to the center of a room. Therefore, when indoors, the pointing direction vector may be calculated by shifting the orientation vector to the reference point. In outdoor environments the subroutine may select a physical reference point in proximity of the user device 102 by using the image recognition system to obtain the reference point.

A "location of secondary devices" subroutine may identify a location of secondary device systems 112 as angle positions according to the reference point as obtained with the orientation to pointing direction subroutine and directions. The location of each secondary device system 112 may be stored in the user device 102, in the processing device 118 if available, or in the transceiver 116 of the secondary device system 112.

A "selection" subroutine may include two distinct elements, namely a matching routine and a trigger routine. The matching routine may utilize the result of the orientation to pointing direction subroutine and the location of secondary devices subroutine to match the orientation of the user device 102 to the location of the secondary device system 112. The trigger routine may utilize the output of one or more sensors 106 it identify the physical motion corresponding to the secondary device 114 of the secondary device system 112. The trigger routine may further or alternatively utilize an amount of time that the matching routine indicates a match, e.g., that the user device 102 is pointing at the secondary device system 112 for a sufficiently long period of time to infer an attempt to select the secondary device 114. The selection subroutine may be utilized to select multiple secondary devices 114, as disclosed herein.

A "control" subroutine may control a selected secondary device 114 using physical motions. The physical motions may be recorded and recognized by sensors 106 such as accelerometers and gyroscopes mounted on the user device 106. The data obtained by the sensors 106 may be sent to the processor 104 and/or the processing device 118 where the data may be processed and commands generated based on the identified physical motions. The processor 104 may direct that the commands be transmitted by the transceiver 108 to the transceiver 116 of the secondary device system 112. The secondary device 114 may then operate according to the commands sent. When controlling multiple secondary devices, the transceiver 108 may transmit to various transceivers 116 serially or all at once.

An "unselect" subroutine may be utilized to unselect or terminate communication between the transceivers 108, 116. The unselect subroutine may run as a background subroutine or may be initiated by the processor upon detecting a physical motion associated with unselecting a secondary device 114. The unselect subroutine may also track an amount of elapsed time during which physical motions related to controlling the function of the selected secondary device 114 are not detected.

Image Recognition Subroutines

Certain processes above that relate to image recognition may be performed on the basis of certain subroutines as implemented by the processor 104. Such subroutines are presented by way of example and may be optionally implemented. Selection and functional control of particular secondary devices 114 may proceed using all, some, or none of the following subroutines, as well as subroutines that may not necessarily be described herein.

A "component initialization" subroutine may initialize sensors 106, such as the camera 119. Such an initialization may make the camera 119 ready to detect incident light, such as by waking the camera up from a hibernation or sleep mode, as disclosed herein. The component initialization may be based on any of a number of prompts as are disclosed herein, including the detection of a physical motion related to the selection of a secondary device 114.

A "filter" subroutine may provide a processor 104 implemented filter to filter out light other than at certain desirable wavelengths. For instance, if the infrared emitter 120 emits light at a certain wavelength, the filter subroutine may operate as a band pass filter centered about that certain wavelength, thereby substantially rejecting light that was not reflected by the infrared reflector 122.

An "image processing" subroutine may put a threshold on the brightness or the wavelength of light detected. In various examples, the camera 119 may treat all detected light as black and white. Such light that passes the brightness threshold may be treated as white and light that does not pass the threshold level may be treated as black. The an edge detection algorithm may be run on white objects by the processor 104 or the camera 119 itself, thereby reading the configuration of that object for further processing, such as by the processor 104 or the processing device 118. Based on the wave length of light, the camera may captures only objects that reflect light within specific range of wave length. The wavelength threshold may operate in addition to or instead of the filter subroutine.

A "processing device" subroutine may transfer captured images from the camera 119 to the processor 104 or the processing device 118 for processing. The processor 104 or the processing device 118 may include a database that includes or may be made to include image recognition information for various secondary device systems 112. Each of the secondary device systems 112 may be given an identifier, such as a unique identifier that may be accessed by a key in the form of a token according to examples well known in the art.

A "configuration recognition" subroutine may be utilized to recognize the light returned from an infrared reflector 122 of a secondary device system 112. The configuration recognition subroutine may identify secondary device systems 112 based on the image reflected by the infrared reflector 122. The configuration recognition subroutine may utilize conventional pattern recognition to compare the detected return from the infrared reflector 122 against patterns known to be associated with particular secondary device systems 112.

An "unselect" subroutine may function according to the unselect subroutine described above.

A "power save" subroutine may disable the camera 119 or place the camera in hibernation or sleep mode to preserve power in the power source.

User Devices

Figure 2C:
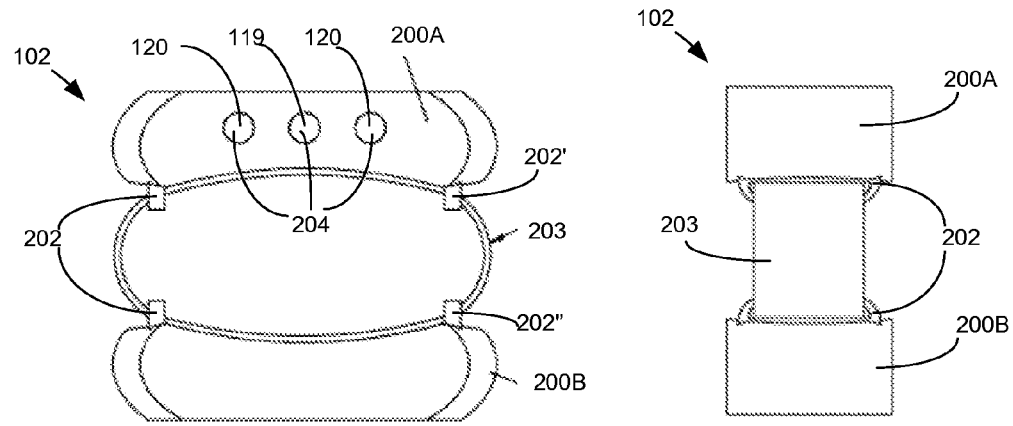
Figure 2C:
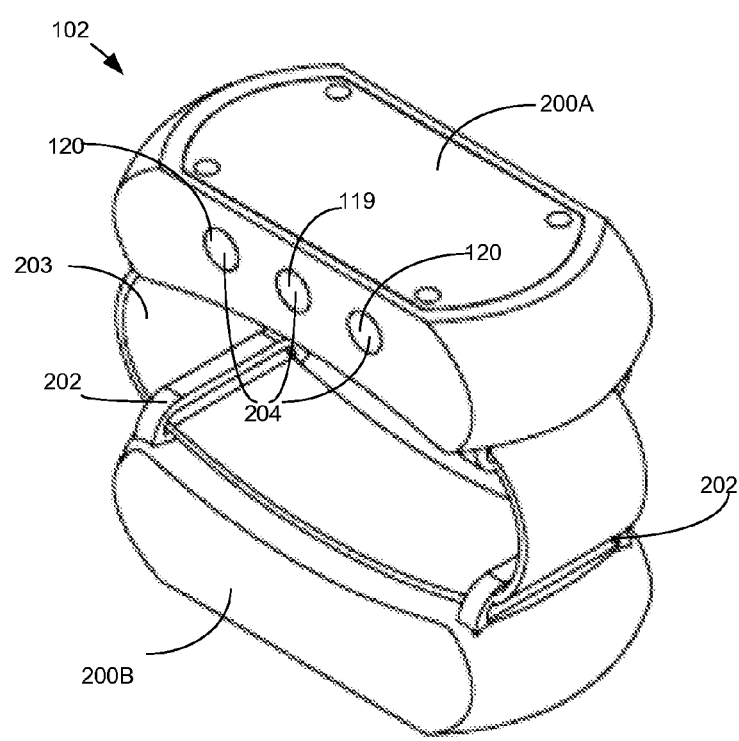
Figure 3:
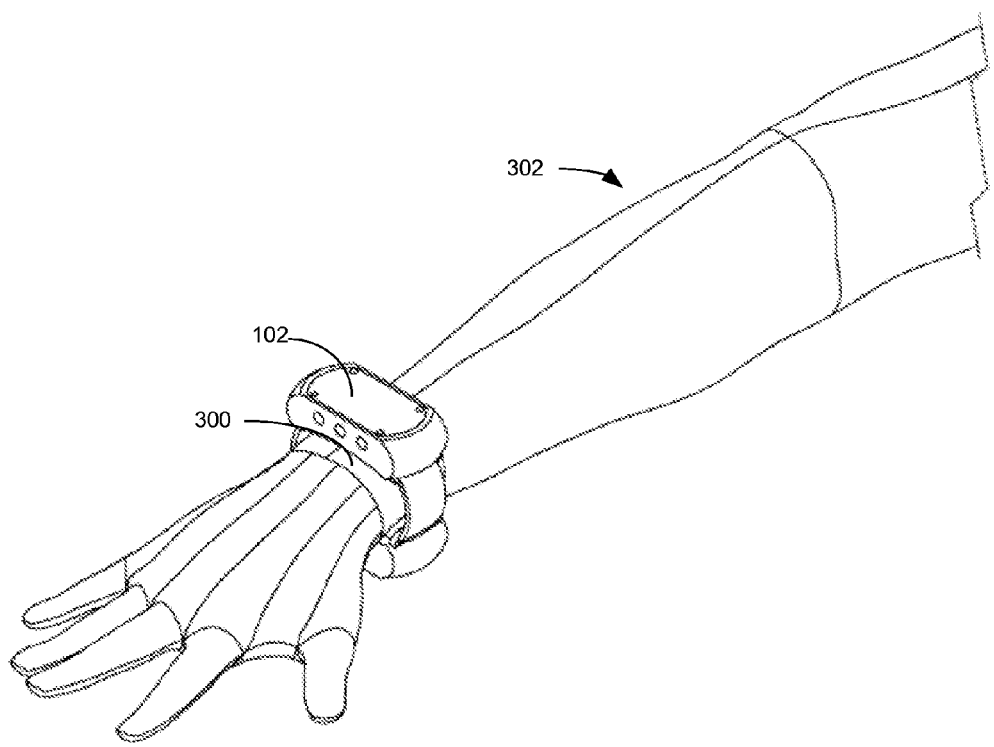
FIG. 3 is a perspective drawing of a user device positioned around a wrist of a user.

FIGS. 2A-2C are front, side and perspective images of the user device 102 that is body-wearable or otherwise securable to a person or object, such as may be worn on or proximate a wrist of a user (see FIG. 3). It is to be emphasized and understood that the user device 102 may be scaled to any of a variety of sizes such as are suitable for wearing on any of a variety of locations on a body of a user, including, but not limited to, a hand, finger, leg, ankle, toe, neck, head, ear, and so forth.

The user device 102 includes a pair of housings 200A, 200B. In the illustrated example, each of the housings 200 include a pair of opposing loops 202. A band 203 may be passed through the loops 202 to create a ring through which a hand may pass so as to secure the device 102 about the user's wrist. In various alternative examples, one band may pass through one loop 202' on one housing 200A and through the opposing loop 202" on the other housing 200B while another band may be passed through the other loops 202 so as to create the ring through which a hand may pass so as to secure the device 102 about the user's wrist. The band may be any of a variety of materials known in the art, including cloth, elastic, rubber, plastic, metal links, and the like.

The components 104, 106, 108, 110, 120 of the user device 102 may be contained within only one housing 200A, B or may be divided between the two housings 200A, B. In various examples, the various components within the housings 200 may communicate between housings, such as by using various wired and wireless communication modalities disclosed herein and/or known in the art. In various examples, a cable may connect the housings 200A, B with respect to one another, such as to share a single power supply 110. In various examples in which there is not a wired connection between the housings 200A, B, each housing 200A, B may incorporate a separate power supply 110.

As illustrated, apertures 204 in the housing provide external access for one or more of the sensors 106. In an example, the internal camera 119 may gather light through an aperture 204, while one or more apertures 204 may allow one or more infrared lamps 120 to emit light, such as may be reflected off of an infrared marker, as disclosed herein. Although only one housing 200A is depicted with apertures 204, the other housing 200B or both housings 200 may incorporate apertures 204. Additionally, any number of apertures 204 may be incorporated into the user device 102 as appropriate.

FIG. 3 is a perspective drawing of the user device 102 positioned around a 300 wrist of a user 302. In various examples, the user device 102 may be decorated to appear as decorative ornamentation. The decorations of the user device 102 may be reconfigurable by a wearer of the user device 102.

Figure 4A:
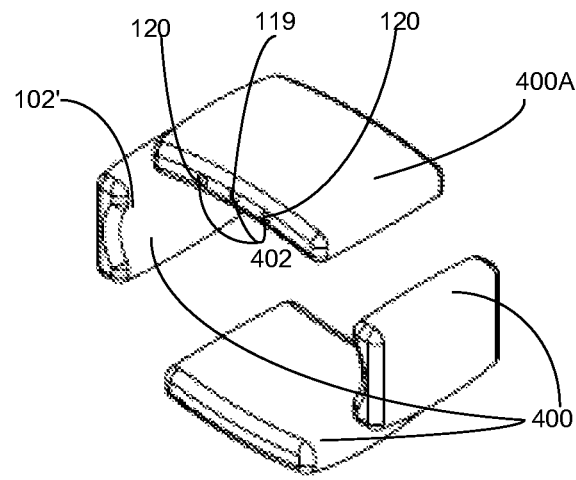
FIGS. 4A and 4B are an alternative example of a body-wearable user device.
Figure 4B:
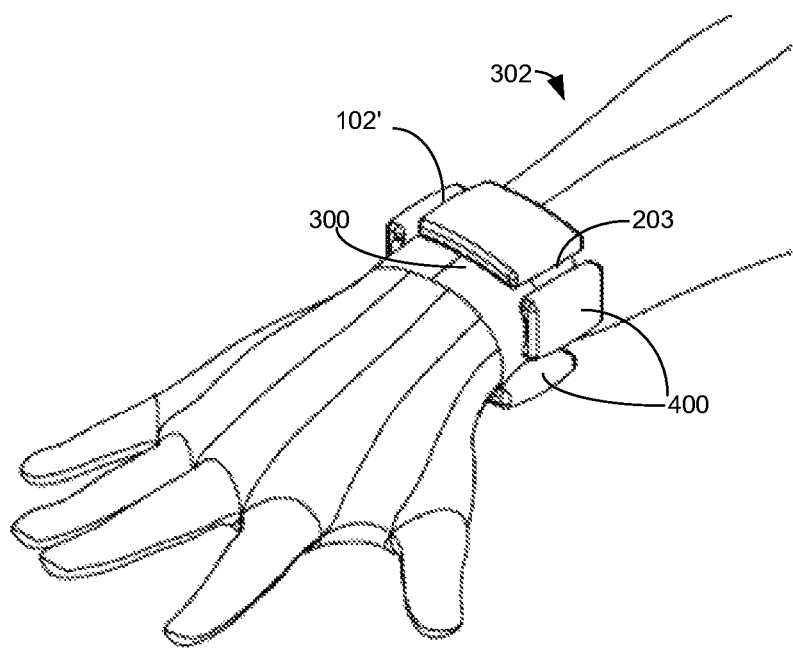

FIGS. 4A and 4B are an alternative example of the body-wearable user device 102', including as positioned on the wrist 300 of the user. The user device 102' may incorporate all of the componentry 104, 106, 108, 110, 120 as the user device 102, but may incorporate four housings 400 rather than two. The housings 400 may be secured with respect to one another with the band 203 (not depicted with respect to FIG. 4A). As illustrated one of the housings 400A includes apertures 402 to provide external access for one or more of the sensors 106, though more than one housing 400 may include an aperture 402. In an example, the internal camera 119 may gather light through an aperture 402, while one or more apertures 402 may allow one or more infrared lamps 120 to emit light, such as may be reflected off of an infrared marker, as disclosed herein.

As with the user device 102, in various examples all of the componentry 104, 106, 108, 110, 120 is located within a single housing 400, while in other examples the componentry is divided among the housings 400. Otherwise, the function and operation of the user device 102' may be the same or essentially the same as that of the user device 102.

It is to be understood that the user devices 102 as disclosed herein may be implemented with as many housings 200, 400 as may be desired, including as few as one housing 200, 400. Relatively more housings 200, 400 may allow for the housings 200, 400 to be relatively thinner than relatively fewer housings 200, 400 owning to more total housings 200, 400 into which the componentry 104, 106, 108, 110, 120 may be enclosed. Conversely, fewer housings 200, 400 may provide for a user device 102 that is relatively more mechanically simple than a user device 102 relatively more housings 200, 400.

In various alternative examples of the user device 102, the housing 200, 400 may form a ring without the use of the band 203. In such examples, the user device 102 may be formed according to the form of various bracelets known in the art, including a continuous ring and a discontinuous ring, such as may include a gap and/or a hinge to support the insertion of a hand through the user device 102. Further, user devices 102 that are configured to be positioned on other locations of the body of a user may have other form factors. For instance, user devices 102 may be configured as earrings for insertion through the ear, a necklace and/or pendant for placement around the neck, a finger ring, an ankle bracelet, and so forth.

Flowcharts

Figure 5:
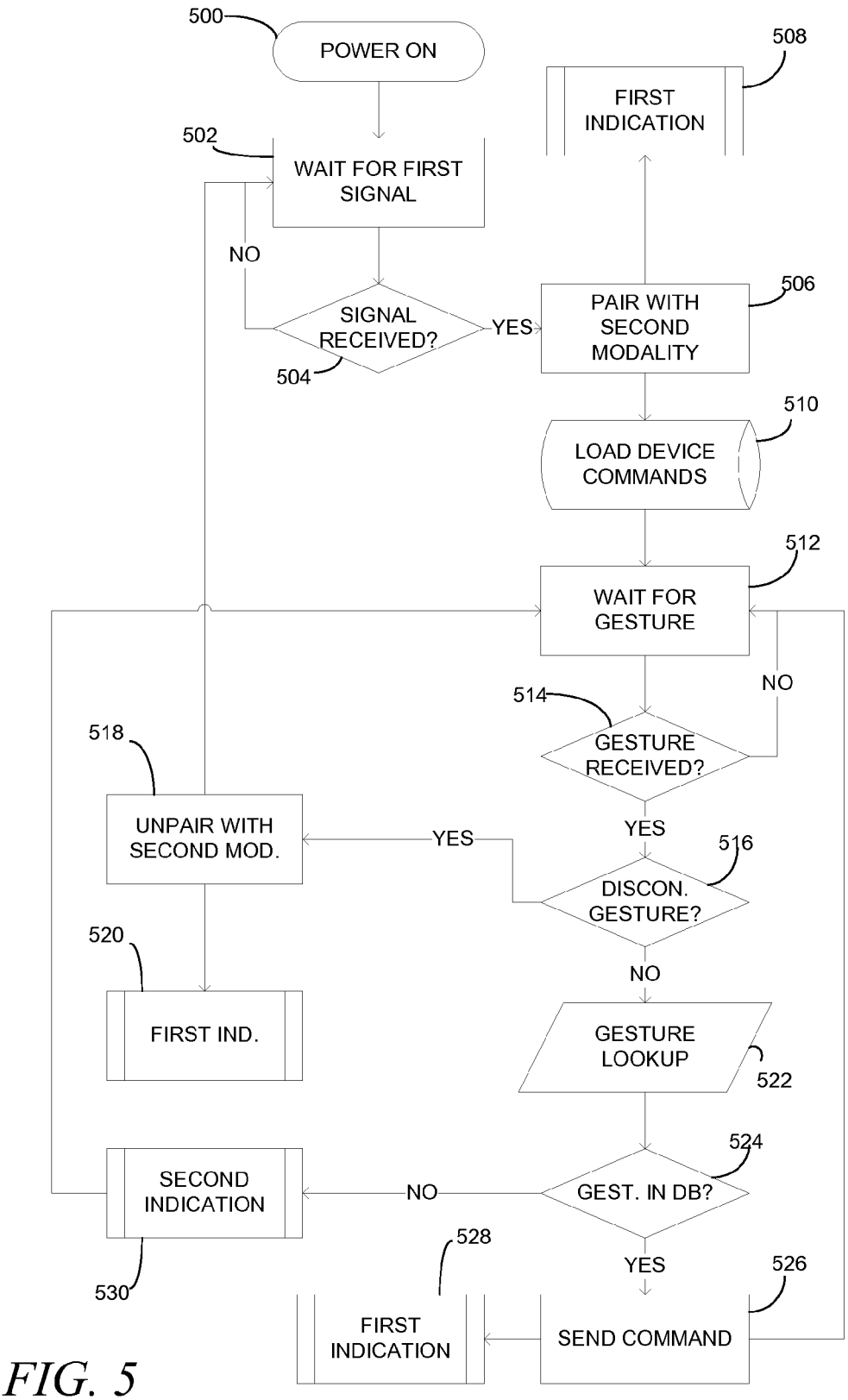
FIG. 5 is a flowchart for controlling the function of a secondary device using a body-wearable user device.

FIG. 5 is a flowchart for controlling the function of a secondary device 114 using a body-wearable user device 102. While the flowchart is detailed in relation to the system 100 disclosed herein, it is to be understood that the flowchart may be applied to any applicable system and/or devices.

At 500, the system 100 is powered on, as disclosed herein.

At 502, the processing device 118 waits for the transceiver 116 to receive a pair signal according to a first wireless communication modality. In an example, the first wireless communication modality is infrared. In various examples, the transceiver 108 and/or the infrared emitter 120 emit the infrared signal.

At 504, the processing device 118 determines if the pair signal has been received. If not, the processing device 118 returns to 502. If so, the processing device 118 proceeds to 506.

At 506, the processing device 118 pairs the user device 102 with the secondary device 112, and in particular the user device wireless transceiver 108 with the secondary device wireless transceiver 116, according to a second wireless communication modality. In an example, the second wireless communication modality is Bluetooth.

At 508, a user interface 126 provides a first indication to the user via the user interface 126. In various examples, the first indication is a visual indication, such as flashing an LED at a first color, such as blue, or according to a pattern, such as one long flash. In various examples, the first indication is an audio indication, such as a tone or pattern of tones. In various examples, the first indication is a haptic indication, such as a shaking of the user device 102.

At 510, the processing device 118 accesses a commands database 128 to obtain a lookup table for a relationship of physical motions by the user and/or the user device 102 with commands for modifying the operation of the particular secondary device 114 with which communication has been established. Additionally or alternatively, rather than accessing an entire lookup table, individual gestures and/or physical motions may be cross-referenced against the lookup table or database on an ad hoc basis as the gestures and/or physical motions are received from the user device 102.

At 512, the processing device 118 waits to receive a gesture (herein after a "gesture" also refers to a physical motion or any other related event as detected by the user device) from the user device 102.

At 514, if a gesture is not received then the processing device 118 returns to 512. If a gesture is received the processing device 118 continues to 516.

At 516, the processing device 118 determines if the gesture corresponds to a disconnection command. In various examples, the disconnection command is common among some or all secondary device 114 types. If the gesture corresponds to a disconnection command then the processing device proceeds to 518. If the gesture does not correspond to a disconnection command the processing device proceeds to 522.

At 518, the processing device 118 causes the user device wireless transceiver 108 and the secondary device wireless transceiver 116 to unpair and returns to 502 as well as proceeds to 520.

At 520, the user interface 126 provides an indication, in an example the first indication, to indicate a successful unpairing of the user device and the secondary device.

At 522, the processing device 118 looks up the gesture in the database 128 lookup table or other data structure to identify an associated command related to the type of secondary device 114.

At 524, the processing device 118 determines if the gesture is in the lookup table. If so the processing device 118 proceeds to 526. If not, the processing device 118 proceeds to 530.

At 526, the processing device 118 causes a command associated with the gesture to be transmitted to the secondary device 114. In an example where the processing device 118 is co-located with the secondary device 114 the processing device 118 implements the command to change the operation of the secondary device 114. In an example where the processing device 118 is not co-located with the secondary device 114, the processing device 118 may transmit the command to the secondary device 114 by way of one or more of the transceivers 108, 116.

At 528, the processing device 118 causes the user interface 126 to provide an indication of the command being successfully obtained and transmitted to the secondary device 114. In an example, the indication is the first indication disclosed herein.

At 530, the processing device 118 provides an indication that a command was not sent to the secondary device 114. The indication may be a second indication different from the first indications disclosed herein. For instance, where the second indication is a visual indication, the indication may flash an LED at a different color (e.g., red rather than blue) than the first indication or at a different pattern. Where the indication is an audio indication, the second indication may be a different tone or different pattern than the first indication. Where the indication is a haptic indication, the second indication may be a different vibration intensity or pattern. The processing device 118 may then return to 512.

Figure 6:
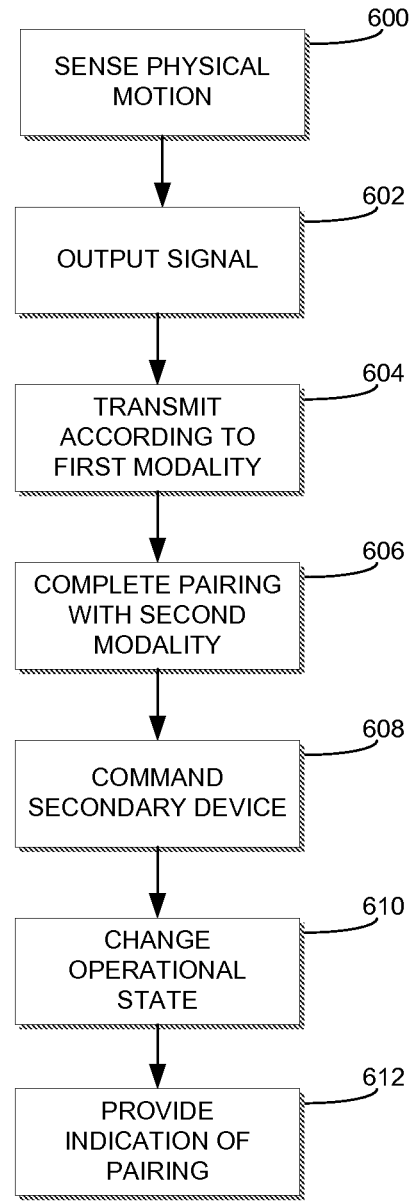
FIG. 6 is a flowchart for controlling the function of a secondary device using a body-wearable user device.

FIG. 6 is a flowchart for controlling the function of a secondary device 114 using a body-wearable user device 102. While the flowchart is detailed in relation to the system 100 disclosed herein, it is to be understood that the flowchart may be applied to any applicable system and/or devices.

At 600, a physical motion of at least one of a user device and a body part of a user of the user device is sensed with a sensor.

At 602, the sensor outputs a signal based on the physical motion.

At 604, a user device wireless transceiver of the user device is caused, by a processor, to transmit to a secondary device wireless transceiver a pair signal according to a first wireless modality based, at least in part, on the signal.

At 606, wireless pairing is completed between the user device wireless transceiver and the secondary device wireless transceiver according to a second wireless modality different than the first wireless modality.

At 608, the user device wireless transceiver is caused to transmit a command to the secondary device wireless transceiver based on an output of the sensor following the completion of the wireless pairing. In an example, the first wireless modality is infrared and the second wireless modality is Bluetooth.

At 610, an operational state of the secondary device is changed based on the command being cross-referenced against a device type of the secondary device in a command lookup table stored on an electronic data storage, the command lookup table including commands corresponding to a plurality of secondary device types. In an example, the command corresponds to one of a plurality of pre-defined gestures as identified based on the physical motion as detected by the sensor.

At 612, an indication of the wireless pairing is provided on a user interface. In an example, the indication is at least one of a visual indication, an audio indication, and a haptic indication.

Examples of Use

The following are examples of use for the user devices disclosed herein. While they will be discussed in particular with respect to the user device 102, it is to be understood that the examples of use may be preformed by any suitable user device. Furthermore, while particular exemplary physical motions and gestures are mentioned, any suitable physical motion may be implemented, whether by choice of the maker of the user device 102 or the user of the user device 102 in examples of the user device 102 in which such gestures are programmable.

Controlling a Lamp

Figure 9A:
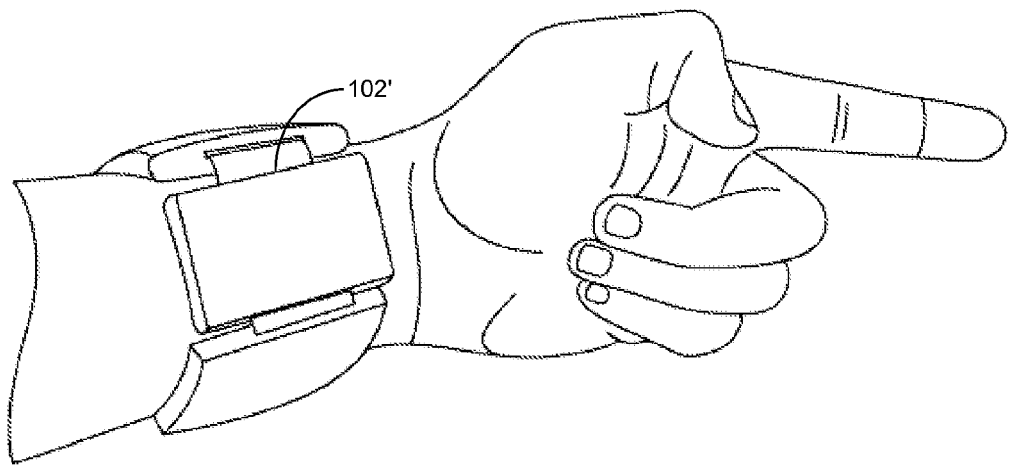
FIGS. 9A-9C are images of a secondary device selection gesture, in an example embodiment.
Figure 9B:
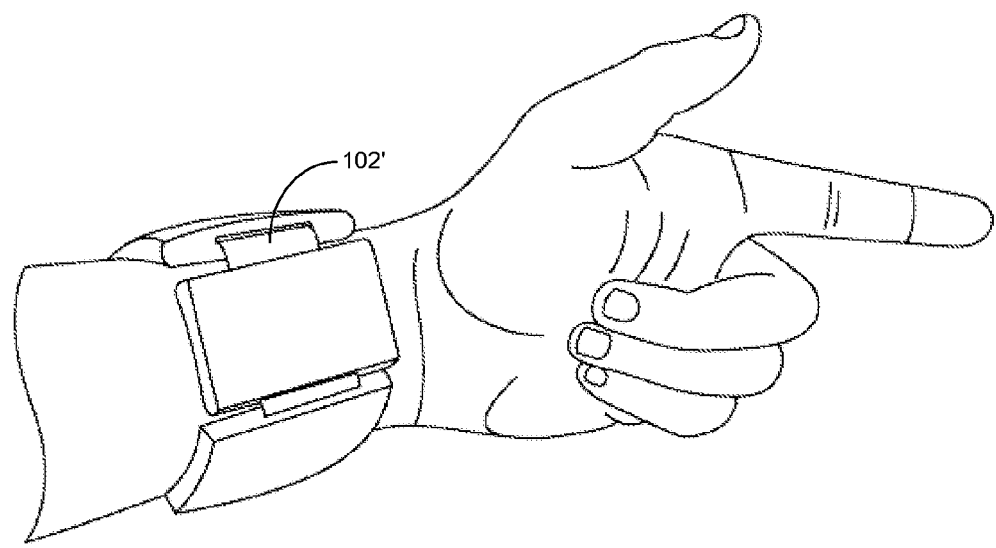
Figure 9C:
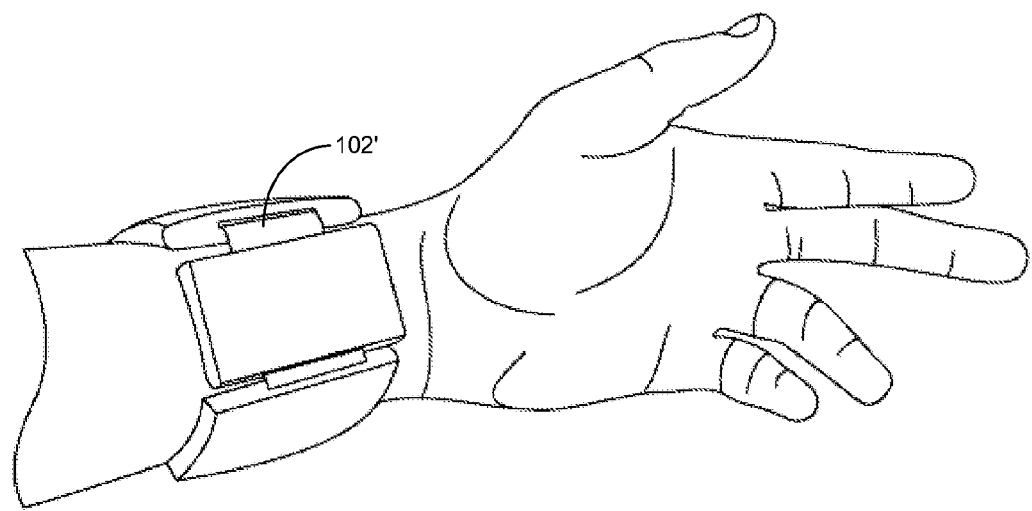

In an example, a user wearing a user device 102 makes a physical motion in the form of a combined wrist-flick and finger point at a secondary device 114 that is a lamp. A camera 119 of the sensor 106 obtains an image of the lamp and, in various examples, of the user's finger pointing at the lamp (illustrated below). In various examples, an accelerometer of the sensor 106 senses the wrist-flick motion, and, in particular, the orientation and motion of the wrist and fingers (see FIGS. 9A-9C). In an example, an electromyography sensor of the sensor 106 detects the flexing of the muscles in the arm of the user that correspond to the muscles involved in the wrist-flick and/or finger point user action.

On the basis of the information from the sensor 106, the processor 104 identifies that the lamp is to be selected. The processor 106 commands the transceiver 108 to transmit a selection signal to the transceiver 116 of the secondary device system 112 of the lamp. On the basis of the section signal, an electronic control of an intensity level of light emitted by the lamp may be established. The lamp may come pre-sold with intensity controls and/or may be modified for electronic intensity control.

In an example, the sensor 106 detects a palm-up finger-raising gesture by the user of the user device 102, such as with the camera 119 and/or the accelerometer or any other suitable sensor 106. On the basis of the sensed gesture, the processor 104 actives the transceiver 108 to transmit a command to cause the light intensity of the lamp to rise, such as by an amount proportional to the number or frequency of finger-raises by the user. An instruction code stream issues the commands, such as one command per gesture or an amount of intensity increase based on the gestures made. The transceiver 116 associated with the lamp may transmit information about the lamp, such as the intensity of the emitted light, back to the transceiver 108 for use as feedback. Optionally, command signals and or information interact wirelessly with the processing device 118 for additional processing resources in the event that the use of the processor 104 becomes undesirable.

On the basis of the command stream, the lamp increases the brightness intensity. When the lamp intensity is bright enough the user may make a gesture or other physical motion to terminate control of the lamp, such as a highly erratic movement, such as by shaking the hands and wrists as if shaking off water. On the basis of the motion sensed by the sensor 106, the processor 104 instructs the transceiver 108 to terminate control contact with the lamp.

Controlling Volume

In an example, a user wearing a user device 102 makes a physical motion in the form of a combined wrist-flick and finger point at a secondary device 114 that is an audio player, such as a music player. In an example, the radio includes an infrared reflector 122. When the accelerometer of the sensor 106 detects characteristic movement of the wrist-flick action the infrared lamp 120 activates and emits infrared light which reflects off of the reflector 122. The returned infrared light is detected by the camera 119, while the camera 119 and/or other sensors may detect the motion of the wrist and finger.

The processor 104 may then command the transceiver 108 to transmit a selection signal to the transceiver 116 and a communication link established between the user device 102 and the audio player. In an example, the user may make a palm-up, two-finger-raise gesture which maybe detected by the sensor 106, such as with the camera 119 and the electromyography sensor. On the basis of gesture, the processor 104 may identify a command to fast forward or otherwise accelerate the playing of music by the music player, in an example by doubling the rate, such that two fingers corresponds to a double rate. In such an example, raising three fingers may triple the rate of playback, and so forth. The processor 104 may generate an instruction code stream to increase the rate of playback and the transceiver 108 may transmit the command to the transceiver 116 of the audio player.

In an example, a processor of the audio player may receive the command from the user device 102 and increase the rate of playback appropriately. The user of the user device 102 may then raise all of their fingers repeatedly as with respect to the lamp example above to increase the volume of the audio player, upon which the sensor 106 may detect the gesture, the processor 104 may generate a command stream, and the transceiver 108 may transmit the command stream. Upon the user making a gesture to break contact with the audio player, such as a wrist-shaking gesture, the transceiver 108 may break the contact with the audio device.

Television Control

In an example, a user who is wearing a user device 102 and who does not necessarily have line-of-sight to a secondary device 114 makes a "thumbs-up" gesture. Sensors 106 detect the orientation of the hand and thumb according to methodologies disclosed herein. The processor 104 recognizes the "thumbs-up" gesture as a command to interact with the television and directs the transceiver 108 to transmit a selection signal to the transceiver 116 of the television. Signals may optionally be transmitted bi-directionally, e.g., between the user device 102 or the processing device 118 and the television to communicate information about the television receiving the command such as that a television show is being recorded for later viewing.

The user may then adjust the channel displayed by the television by shifting from the thumbs-up gesture to increase the channel number to the thumbs-down gesture to decrease the channel number. The sensors 106 detect the motion and orientation of the wrist and thumb and the processor 104 generates commands on the basis of the position of the thumb. In various examples, smoothly rotating the wrist to transition from thumbs-up to thumbs-down may permit channel changes. In an example, the television may be turned off by abruptly making the thumbs-down gesture, such as by jabbing the thumb in the down-direction. Upon the sensor 106 detecting the abrupt thumbs-down gesture, the processor 104 may direct the transceiver 108 to transmit a command to turn off the television. The user may terminate control of the television with a gesture such as is disclosed herein.

Vehicle Control

In an example, a user may wear one user device 102 on each arm of the user. The user may establish a link between at least one of the user devices 102 by holding their hands in a way that pantomimes holding a steering wheel, such as that the "ten-and-two" position. The user devices 102 may communicate with respect to one another to establish a master-slave relationship between the two user devices 102 to determine which user device 102 will control the interaction with the vehicle. In various examples, sensors 106 on both user devices 102 may generate data related to physical motions and gestures by the user, with the slave user device 102 transmitting signals to the master user device 102 and the master user device 102 determining the control of the vehicle based on the data from both sensors 106. Alternatively, the master device 102 may utilize only its own sensor data.

Upon the user making the pantomime steering wheel gesture, the processor 104 may direct the transceiver 108 to transmit the selection signal to the transceiver 116 of the vehicle. On the basis of the sensed data from the sensor 106, such as may be obtained as disclosed herein, the processor 104 may generate a command stream and the transceiver 108 may transmit the command stream to the transceiver 116 of the vehicle. On the basis for various physical motions and gestures by the user, the vehicle may accelerate, decelerate, actuate the front wheels, and so forth. The user may terminate control of the vehicle according to methods disclosed herein.

Control of Multiple Lights

In an example, a user wearing a user device 102 makes a physical motion in the form of a combined wrist-flick and finger point at a secondary device 114 that is a lighting unit, such as a lamp. In an example, when the accelerometer of the sensor 106 detects characteristic movement of the wrist-flick action the camera 119, identifies the image of the lamp as stored in memory on at least one of the user device 102 and the processing device 118. The processor 104 issues a selection command and transceiver 108 transmits the selection command to the transceiver 116 of the lamp, upon which a communication link is established and the intensity of the light may be adjusted as described in detail herein.

Figure 10A:
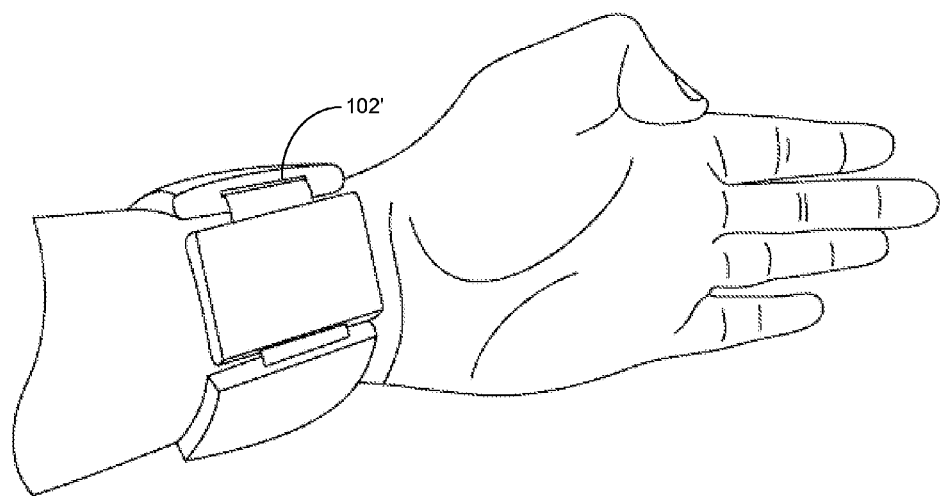
FIGS. 10A-10C are images of a secondary device control gesture, in an example embodiment.
Figure 10B:
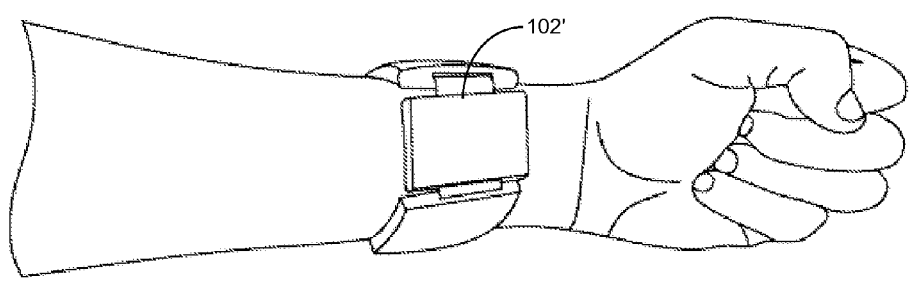
Figure 10C:
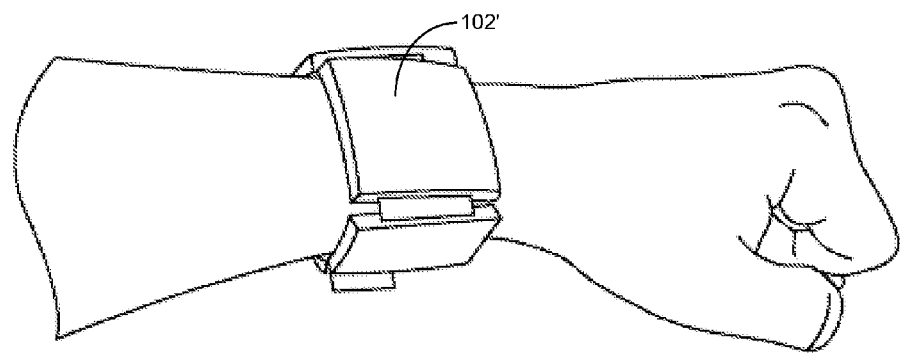
Figure 11:
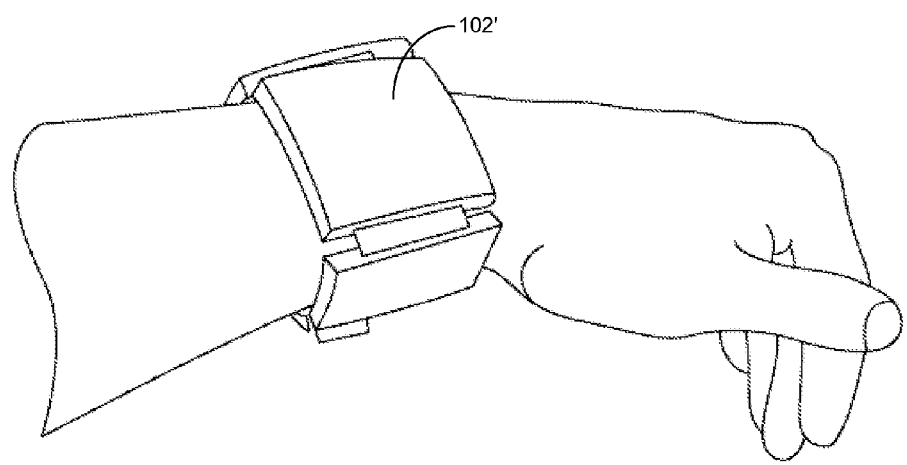
FIG. 11 is an image of a secondary device control gesture, in an example embodiment.

Optionally, rather than immediately issuing the selection command, the user device 102 may prompt the user on a user interface, such as a user interface of the processing unit 118, whether a selection command should be issued to the particular device. The prompt may include a written description of the device that may be selected, an audio description of the device, or an image of the device, such as from the camera 119. In an example, the user may confirm the selection of the lamp through a fist-closing gesture (FIGS. 10A-10C) In various examples, as illustrated below, the wrist may be rotated for various gestures. In an example, rotating the wrist may initiate selection or de-selection of a secondary device 114. In an example, rotating the wrist in a first direction may select the secondary device 114 and rotating the wrist in a second direction may deselect the secondary device 114.

In an example, upon establishing the communication link with the first lamp, the user may make a second physical motion, such as a hand-grasping gesture or a pantomime box or loop gesture around other lamps or point at each lamp in succession. Alternatively, the second physical motion may be made without respect to a previous selection of an individual lamp. When the accelerometer detects the physical motion corresponding to the selection of multiple lamps, the camera 119 identifies the lamps that are within the pantomime box or loop. A selection command may be transmitted by the transceiver 108 to each of the transceivers 116 of the individual lamps. In various examples, the transceiver 108 sends out individual selection commands serially to each of the transceivers 116 of the lamps. Alternatively, the transceiver 108 may send out a general selection command that lists an identity corresponding to the lamps that are selected, such as an identity of the transceivers 116 that are to receive the selection commands. The transceivers 108, 116 may communicate information regarding current selections, e.g., a first transceiver 116 may notify a second transceiver 116 that the first transceiver 116 has been selected but the second transceiver 116 has not been selected.

The user may then control an intensity of all of the selected lights based on a single physical motion, such as is described above with particularity with respect to the lamp example above. Individual lamps may be dropped from the multiple lamps, such as with a pointing gesture at the lamp that is to be dropped. Communication with all of the lights may be terminated by a wrist-shaking gesture.

Control of Various Secondary Devices

In an example, a user wearing a user device 102 makes a physical motion in the form of a combined wrist-flick and finger point at a secondary device 114 that is a lighting unit, such as a lamp. In an example, when the accelerometer of the sensor 106 detects characteristic movement of the wrist-flick action the camera 119, identifies the image of the lamp as stored in memory on at least one of the user device 102 and the processing device 118. The processor 104 issues a selection command and transceiver 108 transmits the selection command to the transceiver 116 of the lamp, upon which a communication link is established and the intensity of the light may be adjusted as described in detail herein.

In an example, upon establishing the communication link with the first lamp, the user may make the wrist-flick and point physical motion at a different secondary device 114, such as an automatic fireplace, wherein a selection command may be transmitted to a transceiver 116 of the fireplace. In a further example, the user may make the wrist-flick and point physical motion at a third secondary device 114, such as an audio player, wherein a selection command may be transmitted to a transceiver 116 of the audio player.

The user may then control an intensity of all of the selected secondary devices 112 based on a single physical motion, such as is described above with particularity with respect to the lamp example above. The control may be based on a pre-established protocol, such as that may lower an intensity of the lamp, raise the intensity of the fireplace, and play a preset playlist on the audio device with a single gesture. Individual secondary devices 112 may be dropped from the group, such as with a pointing gesture at the lamp that is to be dropped. Communication with all of the secondary devices 112 may be terminated by a wrist-shaking gesture.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim.

Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system, comprising:
   a body-wearable user device including a user device wireless transceiver configured to communicate directly with a secondary device wireless transceiver associated with a secondary device;
   a sensor configured to sense a physical motion of at least one of the user device and a body part of a user of the user device and output a signal based on the physical motion; and
   a processor, communicatively coupled to the user device wireless transceiver and the sensor, configured, based on the output from the sensor, to:
      cause the user device wireless transceiver to transmit to the secondary device wireless transceiver a pair signal according to a first wireless modality;
      complete a wireless pairing between the user device wireless transceiver and the secondary device wireless transceiver according to a second wireless modality different than the first wireless modality.

2. The system of claim 1, wherein the processor is further configured to cause the user device wireless transceiver to transmit a command to the secondary device wireless transceiver based on an output of the sensor following the completion of the wireless pairing.

3. The system of claim 2, further comprising an electronic data storage including a command lookup table, the command lookup table including commands corresponding to a plurality of secondary device types, and wherein the secondary device is configured to change an operational state based on the command being cross-referenced against a device type of the secondary device.

4. The system of claim 3, wherein the command corresponds to one of a plurality of pre-defined gestures as identified based on the physical motion as detected by the sensor.

5. The system of claim 1, further comprising a user interface configured to provide an indication of the wireless pairing.

6. The system of claim 5, wherein the indication is at least one of a visual indication, an audio indication, and a haptic indication.

7. The system of claim 1, wherein the first wireless modality is infrared and the second wireless modality is Bluetooth.

8. A user device, comprising:
   a sensor configured to sense a physical motion of at least one of the user device and a body part of a user of the user device and output a signal based on the physical motion; and
   a user device wireless transceiver configured to communicate directly with a secondary device wireless transceiver associated with a secondary device, wherein the user device wireless transceiver:
      transmits to a secondary device wireless transceiver a pair signal according to a first wireless modality based, at least in part, on the signal; and
      completes a wireless pairing between the user device wireless transceiver and the secondary device wireless transceiver according to a second wireless modality different than the first wireless modality.

9. The user device of claim 8, wherein the processor is further configured to cause the user device wireless transceiver to transmit a command to the secondary device wireless transceiver based on an output of the sensor following the completion of the wireless pairing.

10. The user device of claim 8, further comprising a user interface configured to provide an indication of the wireless pairing.

11. The user device of claim 10, wherein the indication is at least one of a visual indication, an audio indication, and a haptic indication.

12. The user device of claim 8, wherein the first wireless modality is infrared and the second wireless modality is Bluetooth.

13. A method, comprising:
   sensing, with a sensor, a physical motion of at least one of a user device and a body part of a user of the user device;
   outputting, with the sensor, a signal based on the physical motion; and
   causing, with a processor, a user device wireless transceiver of the user device to transmit to a secondary device wireless transceiver a pair signal according to a first wireless modality and based, at least in part, on the signal;
   completing a wireless pairing between the user device wireless transceiver and the secondary device wireless transceiver according to a second wireless modality different than the first wireless modality.

14. The method of claim 13, further comprising causing the user device wireless transceiver to transmit a command to the secondary device wireless transceiver based on an output of the sensor following the completion of the wireless pairing.

15. The method of claim 14, further comprising changing an operational state of the secondary device based on the command being cross-referenced against a device type of the secondary device in a command lookup table stored on an electronic data storage, the command lookup table including commands corresponding to a plurality of secondary device types.

16. The method of claim 15, wherein the command corresponds to one of a plurality of pre-defined gestures as identified based on the physical motion as detected by the sensor.

17. The method of claim 13, providing, on a user interface, an indication of the wireless pairing.

18. The method of claim 17, wherein the indication is at least one of a visual indication, an audio indication, and a haptic indication.

19. The method of claim 13, wherein the first wireless modality is infrared and the second wireless modality is Bluetooth.

* * * * *